United States Patent
Lee et al.

(10) Patent No.: US 12,444,155 B2
(45) Date of Patent: Oct. 14, 2025

(54) ROBUST IMAGE-TO-DESIGN ALIGNMENT FOR DRAM

(71) Applicant: KLA Corporation, Milpitas, CA (US)

(72) Inventors: Hucheng Lee, Cupertino, CA (US); Huan Jin, Dublin, CA (US)

(73) Assignee: KLA CORPORATION, Milpitas, CA (US)

( * ) Notice: Subject to any disclaimer, the term of this patent is extended or adjusted under 35 U.S.C. 154(b) by 198 days.

(21) Appl. No.: 18/480,503

(22) Filed: Oct. 4, 2023

(65) Prior Publication Data
US 2025/0069354 A1    Feb. 27, 2025

Related U.S. Application Data

(60) Provisional application No. 63/534,581, filed on Aug. 25, 2023.

(51) Int. Cl.
| | |
|---|---|
| G06V 10/24 | (2022.01) |
| G06F 9/455 | (2018.01) |
| G06V 10/762 | (2022.01) |

(52) U.S. Cl.
CPC .......... *G06V 10/24* (2022.01); *G06F 9/45516* (2013.01); *G06V 10/762* (2022.01)

(58) Field of Classification Search
None
See application file for complete search history.

(56) References Cited

U.S. PATENT DOCUMENTS

| | | | | |
|---|---|---|---|---|
| 4,247,203 A | * | 1/1981 | Levy | G03F 1/84 356/398 |
| 5,219,765 A | * | 6/1993 | Yoshida | H01L 22/20 148/DIG. 162 |
| 6,020,957 A | * | 2/2000 | Rosengaus | G01N 21/9501 356/237.4 |
| 7,570,796 B2 | | 8/2009 | Zafar et al. | |

(Continued)

FOREIGN PATENT DOCUMENTS

| | | |
|---|---|---|
| KR | 10-2020-0089621 | 7/2020 |
| WO | 2021-067203 | 4/2021 |

OTHER PUBLICATIONS

U.S. Appl. No. 18/178,528 by Chen et al., filed Mar. 5, 2023.
International Search Report and Written Opinion for PCT/US2024/042590 mailed Dec. 5, 2024.

*Primary Examiner* — Soo Shin
(74) *Attorney, Agent, or Firm* — Entropy Matters LLC

(57) ABSTRACT

Methods and systems for alignment for semiconductor applications are provided. One method includes determining different align-to-design offsets for multiple instances of an alignment target formed on a specimen by separately aligning images of the multiple instances of the alignment target generated by an imaging subsystem to a rendered image for the alignment target with different alignment methods, respectively. The method also includes identifying the multiple instances having a difference between the different align-to-design offsets below a predetermined threshold. In addition, the method includes determining a runtime align-to-design offset for the alignment target from the different align-to-design offsets determined for only the identified multiple instances. That runtime align-to-design offset can then be used in a process performed on the specimen with an imaging subsystem.

20 Claims, 6 Drawing Sheets

(56) References Cited

U.S. PATENT DOCUMENTS

| | | | |
|---|---|---|---|
| 7,676,077 B2 | 3/2010 | Kulkarni et al. | |
| 8,126,255 B2 | 2/2012 | Bhaskar et al. | |
| 8,664,594 B1 | 3/2014 | Jiang et al. | |
| 8,692,204 B2 | 4/2014 | Kojima et al. | |
| 8,698,093 B1 | 4/2014 | Gubbens et al. | |
| 8,716,662 B1 | 5/2014 | MacDonald et al. | |
| 9,222,895 B2 | 12/2015 | Duffy et al. | |
| 9,830,421 B2 | 11/2017 | Bhattacharyya et al. | |
| 10,620,135 B2 | 4/2020 | Brauer | |
| 10,698,325 B2 | 6/2020 | Brauer | |
| 11,328,435 B2 | 5/2022 | Brauer et al. | |
| 11,580,650 B2 | 2/2023 | Brauer et al. | |
| 2003/0174330 A1* | 9/2003 | Tanaka | G03F 9/7011 356/401 |
| 2015/0234279 A1* | 8/2015 | Fujiwara | H01L 21/0274 438/763 |
| 2016/0292840 A1 | 10/2016 | Konecky | |
| 2016/0329024 A1* | 11/2016 | Maeda | G09G 3/3648 |
| 2018/0008995 A1 | 1/2018 | Baker et al. | |
| 2020/0226744 A1* | 7/2020 | Cohen | G06T 7/11 |
| 2021/0097704 A1* | 4/2021 | Brauer | G03F 7/7065 |
| 2021/0132488 A1* | 5/2021 | Shishido | H01L 21/0274 |
| 2022/0375051 A1 | 11/2022 | Brauer et al. | |

\* cited by examiner

ROBUST IMAGE-TO-DESIGN ALIGNMENT FOR DRAM

BACKGROUND OF THE INVENTION

1. Field of the Invention

The present invention generally relates to alignment for semiconductor applications. Certain embodiments relate to methods and systems for determining an offset for use in a process performed on a specimen.

2. Description of the Related Art

The following description and examples are not admitted to be prior art by virtue of their inclusion in this section.

An integrated circuit (IC) design may be developed using a method or system such as electronic design automation (EDA), computer aided design (CAD), and other IC design software. Such methods and systems may be used to generate the circuit pattern database from the IC design. The circuit pattern database includes data representing a plurality of layouts for various layers of the IC. Data in the circuit pattern database may be used to determine layouts for a plurality of reticles. A layout of a reticle generally includes a plurality of polygons that define features in a pattern on the reticle. Each reticle is used to fabricate one of the various layers of the IC. The layers of the IC may include, for example, a junction pattern in a semiconductor substrate, a gate dielectric pattern, a gate electrode pattern, a contact pattern in an interlevel dielectric, and an interconnect pattern on a metallization layer.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on wafers to promote higher yield in the manufacturing process and thus higher profits. Inspection has always been an important part of fabricating semiconductor devices such as ICs. As design rules shrink, however, semiconductor manufacturing processes may be operating closer to the limitations on the performance capability of the processes. In addition, smaller defects can have an impact on the electrical parameters of the device as the design rules shrink, which drives more sensitive inspections. Therefore, as design rules shrink, the population of potentially yield relevant defects detected by inspection grows dramatically, and the population of nuisance defects detected by inspection also increases dramatically.

Inspection systems and methods are increasingly being designed to focus on the relationship between defect and design since it is the impact on the design for a specimen that will determine whether and how much a defect matters. For example, some methods have been developed for aligning inspection and design coordinates. One such method depends on the accuracy of the inspection system coordinate registration to design. Another such method involves conducting post-processing alignment on the inspection image patch and associated design clip.

Some currently used methods perform patch-to-design alignment (PDA) to align specimen images to a design. During setup, the currently used methods may scan a specimen to find alignment targets and acquire design for each target. Such methods may then render an image from design at each target and align the rendered image and specimen image at each target. For example, currently used methods may use an alignment method to calculate the PDA offsets between PDA target optical images and design-rendered images during PDA setup. The currently used methods may then save the targets and offsets to a database for runtime inspection. The runtime PDA process may then be performed in any suitable manner. For example, during PDA runtime, the setup PDA target image and runtime PDA target image may be aligned to each other.

While the currently used PDA methods have proved useful in a number of applications, there are a number of disadvantages to such methods and systems. For example, some memory devices may have a limited number of suitable alignment targets for use in PDA (or any alignment method). More specifically, a substantial number of the patterned features formed in such devices are not unique enough to be used for alignment. The relatively limited number of alignment targets available in such devices means that successful alignment can only be achieved when a substantially large portion of the alignment targets produce accurate results. For example, some alignment methods aggregate the alignment results for multiple alignment targets to generate a more robust alignment offset for at least a portion of the device. When there are a relatively limited number of alignment targets available to start with, the alignment method success can become more sensitive to the alignment results of each individual alignment target instance. In other words, an inaccurate alignment result produced for even a relatively limited number of alignment target instances can produce an aggregated result that is also inaccurate.

Accordingly, it would be advantageous to develop systems and methods for determining an offset for use in a process performed on a specimen that do not have one or more of the disadvantages described above.

SUMMARY OF THE INVENTION

The following description of various embodiments is not to be construed in any way as limiting the subject matter of the appended claims.

One embodiment relates to a system configured for determining an offset for use in a process performed on a specimen. The system includes an imaging subsystem configured for generating images of a specimen. The system also includes a computer subsystem configured for determining first and second align-to-design offsets for multiple instances of an alignment target by separately aligning images of the multiple instances of the alignment target formed on the specimen and generated by the imaging subsystem to a rendered image for the alignment target with first and second alignment methods, respectively. The computer subsystem is also configured for identifying the multiple instances having a difference between the first and second align-to-design offsets below a predetermined threshold. In addition, the computer subsystem is configured for determining a runtime align-to-design offset for the alignment target from the first and second align-to-design offsets determined for only the identified multiple instances. The computer subsystem is further configured for storing the runtime align-to-design offset for use in a process performed on the specimen with the imaging subsystem. The system may be further configured as described herein.

Another embodiment relates to a computer-implemented method for determining an offset for use in a process performed on a specimen. The method includes determining first and second align-to-design offsets for multiple instances of an alignment target formed on a specimen by separately aligning images of the multiple instances of the alignment target generated by an imaging subsystem to a rendered image for the alignment target with first and second alignment methods, respectively. The method also includes the identifying, determining a runtime align-to-design offset, and storing steps described above. The steps of the method are performed by a computer system.

Each of the steps of the method may be performed as described further herein. The method may include any other step(s) of any other method(s) described herein. The method may be performed by any of the systems described herein.

An additional embodiment relates to a non-transitory computer-readable medium storing program instructions executable on a computer system for performing a computer-implemented method for determining an offset for use in a process performed on a specimen. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

Figure 1:
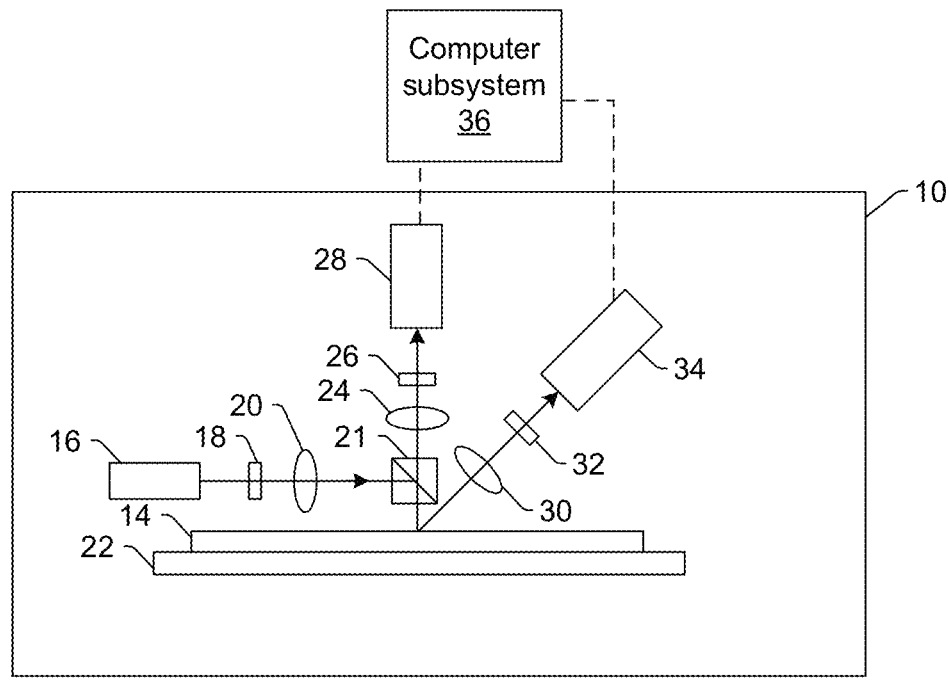
FIGS. 1 and 2 are schematic diagrams illustrating side views of embodiments of a system configured as described herein.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

The terms "design," "design data," and "design information" as used interchangeably herein generally refer to the physical design (layout) of an IC or other semiconductor device and data derived from the physical design through complex simulation or simple geometric and Boolean operations. The design may include any other design data or design data proxies described in commonly owned U.S. Pat. No. 7,570,796 issued on Aug. 4, 2009 to Zafar et al. and U.S. Pat. No. 7,676,077 issued on Mar. 9, 2010 to Kulkarni et al., both of which are incorporated by reference as if fully set forth herein. In addition, the design data can be standard cell library data, integrated layout data, design data for one or more layers, derivatives of the design data, and full or partial chip design data. Furthermore, the "design," "design data," and "design information" described herein refers to information and data that is generated by semiconductor device designers in a design process and is therefore available for use in the embodiments described herein well in advance of printing of the design on any physical specimens such as reticles and wafers.

The terms "first" and "second" as used herein are not intended to have any connotation other than to indicate different things, e.g., different offsets, different alignment methods, etc.

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

One embodiment relates to a system configured for determining an offset for use in a process performed on a specimen. The offsets determined by the embodiments described herein can be used for applications such as IC design to optical (or other) image alignment. The embodiments described herein may be particularly suitable for patch-to-design (PDA) alignment for semiconductor applications like dynamic random access memory (DRAM) inspection.

In some embodiments, the specimen is a wafer. The wafer may include any wafer known in the semiconductor arts. Although some embodiments may be described herein with respect to a wafer or wafers, the embodiments are not limited in the specimens for which they can be used. For example, the embodiments described herein may be used for specimens such as reticles, flat panels, personal computer (PC) boards, and other semiconductor specimens.

The system includes an imaging subsystem configured for generating images of a specimen. In general, the imaging subsystem includes at least an energy source and a detector. The energy source is configured to generate energy that is directed to a specimen. The detector is configured to detect energy from the specimen and to generate output responsive to the detected energy.

In one embodiment, the imaging subsystem is a light-based imaging subsystem. For example, as shown in FIG. 1, imaging subsystem 10 includes an illumination subsystem configured to direct light to specimen 14. The illumination subsystem includes at least one light source, e.g., light source 16. The illumination subsystem is configured to direct the light to the specimen at one or more angles of incidence, which may include one or more oblique angles and/or one or more normal angles. For example, as shown in FIG. 1, light from light source 16 is directed through optical element 18 and then lens 20 to beam splitter 21, which directs the light to specimen 14 at a normal angle of incidence. The angle of incidence may include any suitable angle of incidence, which may vary depending on, for instance, characteristics of the specimen, the defects to be detected on the specimen, the measurements to be performed on the specimen, etc.

The illumination subsystem may be configured to direct the light to the specimen at different angles of incidence at different times. For example, the imaging subsystem may be configured to alter one or more characteristics of one or more elements of the illumination subsystem such that the light can be directed to the specimen at an angle of incidence that is different than that shown in FIG. 1. In one such example, the imaging subsystem may be configured to move light source 16, optical element 18, and lens 20 such that the light is directed to the specimen at a different angle of incidence.

In some instances, the imaging subsystem may be configured to direct light to the specimen at more than one angle of incidence at the same time. For example, the imaging subsystem may include more than one illumination channel, one of the illumination channels may include light source 16, optical element 18, and lens 20 as shown in FIG. 1 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen at different angles of incidence may be different such that light resulting from illumination of the specimen at the different angles of incidence can be discriminated from each other at the detector(s).

In another instance, the illumination subsystem may include only one light source (e.g., source 16 shown in FIG. 1) and light from the light source may be separated into different optical paths (e.g., based on wavelength, polarization, etc.) by one or more optical elements (not shown) of the illumination subsystem. Light in each of the different optical paths may then be directed to the specimen. Multiple illumination channels may be configured to direct light to the specimen at the same time or at different times (e.g., when different illumination channels are used to sequentially illuminate the specimen). In another instance, the same illumination channel may be configured to direct light to the specimen with different characteristics at different times. For example, optical element 18 may be configured as a spectral filter and the properties of the spectral filter can be changed in a variety of different ways (e.g., by swapping out the spectral filter) such that different wavelengths of light can be directed to the specimen at different times. The illumination subsystem may have any other suitable configuration known in the art for directing light having different or the same characteristics to the specimen at different or the same angles of incidence sequentially or simultaneously.

Light source 16 may include a broadband plasma (BBP) light source. In this manner, the light generated by the light source and directed to the specimen may include broadband light. However, the light source may include any other suitable light source such as any suitable laser known in the art configured to generate light at any suitable wavelength(s) known in the art. The laser may be configured to generate light that is monochromatic or nearly-monochromatic. In this manner, the laser may be a narrowband laser. The light source may also include a polychromatic light source that generates light at multiple discrete wavelengths or wavebands.

Light from optical element 18 may be focused to beam splitter 21 by lens 20. Although lens 20 is shown in FIG. 1 as a single refractive optical element, in practice, lens 20 may include a number of refractive and/or reflective optical elements that in combination focus the light from the optical element to the specimen. The illumination subsystem shown in FIG. 1 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the system may be configured to alter one or more elements of the illumination subsystem based on the type of illumination to be used for inspection, metrology, etc.

The imaging subsystem may also include a scanning subsystem configured to cause the light to be scanned over the specimen. For example, the imaging subsystem may include stage 22 on which specimen 14 is disposed during inspection, measurement, etc. The scanning subsystem may include any suitable mechanical and/or robotic assembly (that includes stage 22) that can be configured to move the specimen such that the light can be scanned over the specimen. In addition, or alternatively, the imaging subsystem may be configured such that one or more optical elements of the imaging subsystem perform some scanning of the light over the specimen. The light may be scanned over the specimen in any suitable fashion.

The imaging subsystem includes one or more detection channels. At least one of the detection channels includes a detector configured to detect light from the specimen due to illumination of the specimen by the imaging subsystem and to generate output responsive to the detected light. For example, the imaging subsystem shown in FIG. 1 includes two detection channels, one formed by collector 24, element 26, and detector 28 and another formed by collector 30, element 32, and detector 34. As shown in FIG. 1, the two detection channels are configured to collect and detect light at different angles of collection. In some instances, one detection channel is configured to detect specularly reflected light, and the other detection channel is configured to detect light that is not specularly reflected (e.g., scattered, diffracted, etc.) from the specimen. However, two or more of the detection channels may be configured to detect the same type of light from the specimen (e.g., specularly reflected light). Although FIG. 1 shows an imaging subsystem that includes two detection channels, the imaging subsystem may include a different number of detection channels (e.g., only one detection channel or two or more detection channels). Although each of the collectors are shown in FIG. 1 as single refractive optical elements, each of the collectors may include one or more refractive optical element(s) and/or one or more reflective optical element(s).

The one or more detection channels may include any suitable detectors known in the art such as photo-multiplier tubes (PMTs), charge coupled devices (CCDs), and time delay integration (TDI) cameras. The detectors may also include non-imaging detectors or imaging detectors. If the detectors are non-imaging detectors, each of the detectors may be configured to detect certain characteristics of the light such as intensity but may not be configured to detect such characteristics as a function of position within the imaging plane. As such, the output that is generated by each of the detectors included in each of the detection channels may be signals or data, but not image signals or image data. In such instances, a computer subsystem such as computer subsystem 36 of the system may be configured to generate images of the specimen from the non-imaging output of the detectors. However, in other instances, the detectors may be configured as imaging detectors that are configured to generate imaging signals or image data. Therefore, the system may be configured to generate output and/or images described herein in a number of ways.

FIG. 1 is provided herein to generally illustrate a configuration of an imaging subsystem that may be included in the system embodiments described herein. Obviously, the imaging subsystem configuration described herein may be altered to optimize the performance of the system as is normally performed when designing a commercial inspection, metrology, etc. system. In addition, the systems described herein may be implemented using an existing inspection or metrology system (e.g., by adding functionality described herein to an existing inspection or metrology system) such as the 29xx and 39xx series of tools, the SpectraShape family of tools, and the Archer series of tools that are commercially available from KLA Corp., Milpitas, Calif. For some such systems, the embodiments described herein may be provided as optional functionality of the system (e.g., in addition to other functionality of the system). Alternatively, the imaging subsystem described herein may be designed "from scratch" to provide a completely new system.

Computer subsystem 36 of the system may be coupled to the detectors of the imaging subsystem in any suitable manner (e.g., via one or more transmission media, which may include "wired" and/or "wireless" transmission media) such that the computer subsystem can receive the output generated by the detectors during scanning of the specimen. Computer subsystem 36 may be configured to perform a number of functions using the output of the detectors as described herein and any other functions described further herein. This computer subsystem may be further configured as described herein.

This computer subsystem (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer subsystem (not shown), the different computer subsystems may be coupled to each other such that images, data, information, instructions, etc. can be sent between the computer subsystems as described further herein. For example, computer subsystem 36 may be coupled to other computer subsystem(s) by any suitable transmission media, which may include any suitable wired and/or wireless transmission media known in the art. Two or more of such computer subsystems may also be effectively coupled by a shared computer-readable storage medium (not shown).

Although the imaging subsystem is described above as being an optical or light-based subsystem, in another embodiment, the imaging subsystem is an electron beam imaging subsystem. In one such embodiment shown in FIG. 2, the imaging subsystem includes electron column 122, which is coupled to computer subsystem 124.

Figure 2:
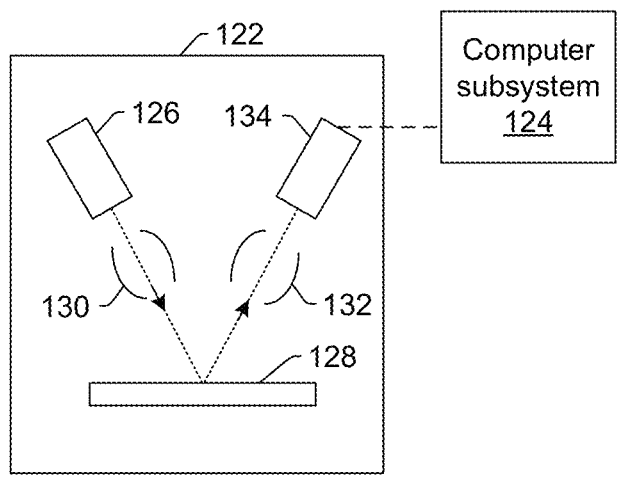

As also shown in FIG. 2, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al., U.S. Pat. No. 8,698,093 issued Apr. 15, 2014 to Gubbens et al., and U.S. Pat. No. 8,716,662 issued May 6, 2014 to MacDonald et al., which are incorporated by reference as if fully set forth herein.

Although the electron column is shown in FIG. 2 as being configured such that the electrons are directed to the specimen at an oblique angle of incidence and are collected from the specimen at another oblique angle, the electron beam may be directed to and collected from the specimen at any suitable angles. In addition, the electron beam subsystem may be configured to use multiple modes to generate images of the specimen (e.g., with different illumination angles, collection angles, etc.). The multiple modes of the electron beam subsystem may be different in any image generation parameter(s) of the subsystem.

Computer subsystem 124 may be coupled to detector 134 as described above. The detector may detect electrons returned from the surface of the specimen thereby forming electron beam images of the specimen. Computer subsystem 124 may be configured to perform any of the functions described herein using the electron beam images. Computer subsystem 124 may be configured to perform any additional step(s) described herein. A system that includes the imaging subsystem shown in FIG. 2 may be further configured as described herein.

FIG. 2 is provided herein to generally illustrate a configuration of an electron beam-based imaging subsystem that may be included in the embodiments described herein. As with the optical subsystem described above, the electron beam subsystem configuration may be altered to optimize the performance of the subsystem as is normally performed when designing a commercial inspection or metrology system. In addition, the systems described herein may be implemented using an existing inspection, metrology, or other system (e.g., by adding functionality described herein to an existing system) such as tools that are commercially available from KLA. For some such systems, the embodiments described herein may be provided as optional functionality of the system (e.g., in addition to other functionality of the system). Alternatively, the system described herein may be designed "from scratch" to provide a completely new system.

Although the imaging subsystem is described above as being a light-based or electron beam-based subsystem, the imaging subsystem may be an ion beam-based subsystem. Such an imaging subsystem may be configured as shown in FIG. 2 except that the electron beam source may be replaced with any suitable ion beam source known in the art. In one embodiment, therefore, the energy directed to the specimen includes ions. In addition, the imaging subsystem may be any other suitable ion beam-based imaging subsystem such as those included in commercially available focused ion beam (FIB) systems, helium ion microscopy (HIM) systems, and secondary ion mass spectroscopy (SIMS) systems.

The imaging subsystems described herein may be configured to generate output for the specimen with multiple modes. In general, a "mode" is defined by the values of parameters of the imaging subsystem used for generating the images of the specimen. Therefore, modes may be different in the values for at least one of the parameters of the imaging subsystem (other than position on the specimen at which the output is generated). For example, in an optical subsystem, different modes may use different wavelength(s) of light for illumination. The modes may be different in the illumination wavelength(s) as described further herein (e.g., by using different light sources, different spectral filters, etc.) for different modes. In another embodiment, different modes may use different illumination channels of the imaging subsystem. For example, as noted above, the imaging subsystem may include more than one illumination channel. As such, different illumination channels may be used for different modes. The modes may be different in any one or more alterable parameters (e.g., illumination polarization(s), angle(s), wavelength(s), etc., detection polarization(s), angle(s), wavelength(s), etc.) of the imaging subsystem.

In a similar manner, the output generated by the electron beam subsystem may include output generated by the electron beam subsystem with two or more different values of a parameter of the electron beam subsystem. The multiple modes of the electron beam subsystem can be defined by the values of parameters of the electron beam subsystem used for generating output for a specimen. Therefore, modes that are different may be different in the values for at least one of the electron beam parameters of the electron beam subsystem. For example, in one embodiment of an electron beam subsystem, different modes may use different angles of incidence for illumination.

The imaging subsystem embodiments described herein may be configured for inspection, metrology, defect review, or another quality control related process performed on the specimen. For example, the embodiments of the imaging subsystems described herein and shown in FIGS. 1 and 2 may be modified in one or more parameters to provide different imaging capability depending on the application for which they will be used. In one such example, the imaging subsystem shown in FIG. 1 may be configured to have a higher resolution if it is to be used for defect review or metrology rather than for inspection. In other words, the embodiments of the imaging subsystems shown in FIGS. 1 and 2 describe some general and various configurations for an imaging subsystem that can be tailored in a number of manners that will be obvious to one skilled in the art to produce imaging subsystems having different imaging capabilities that are more or less suitable for different applications.

As noted above, the optical, electron, and ion beam subsystems are configured for scanning energy (e.g., light, electrons, etc.) over a physical version of the specimen thereby generating output for the physical version of the specimen. In this manner, the optical, electron, and ion beam subsystems may be configured as "actual" subsystems, rather than "virtual" subsystems. However, a storage medium (not shown) and computer subsystem 36 shown in FIG. 1 may be configured as a "virtual" system. In particular, the storage medium and the computer subsystem may be configured as a "virtual" inspection system as described in commonly assigned U.S. Pat. No. 8,126,255 issued on Feb. 28, 2012 to Bhaskar et al. and U.S. Pat. No. 9,222,895 issued on Dec. 29, 2015 to Duffy et al., both of which are incorporated by reference as if fully set forth herein. The embodiments described herein may be further configured as described in these patents.

Figure 3:
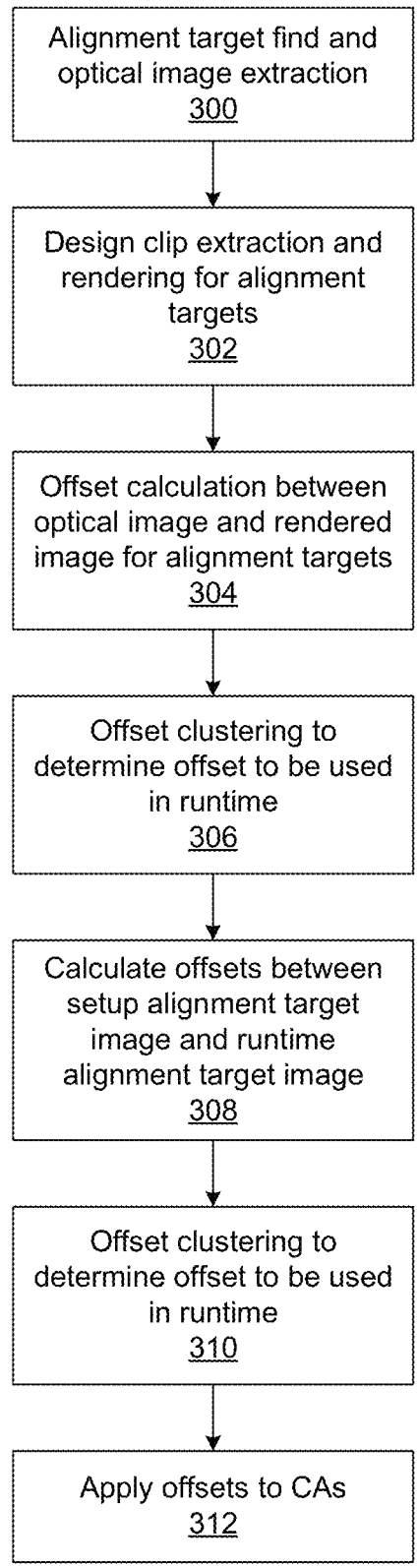
FIG. 3 is a flow chart illustrating steps that may be performed by currently used systems and methods.
Figure 4:
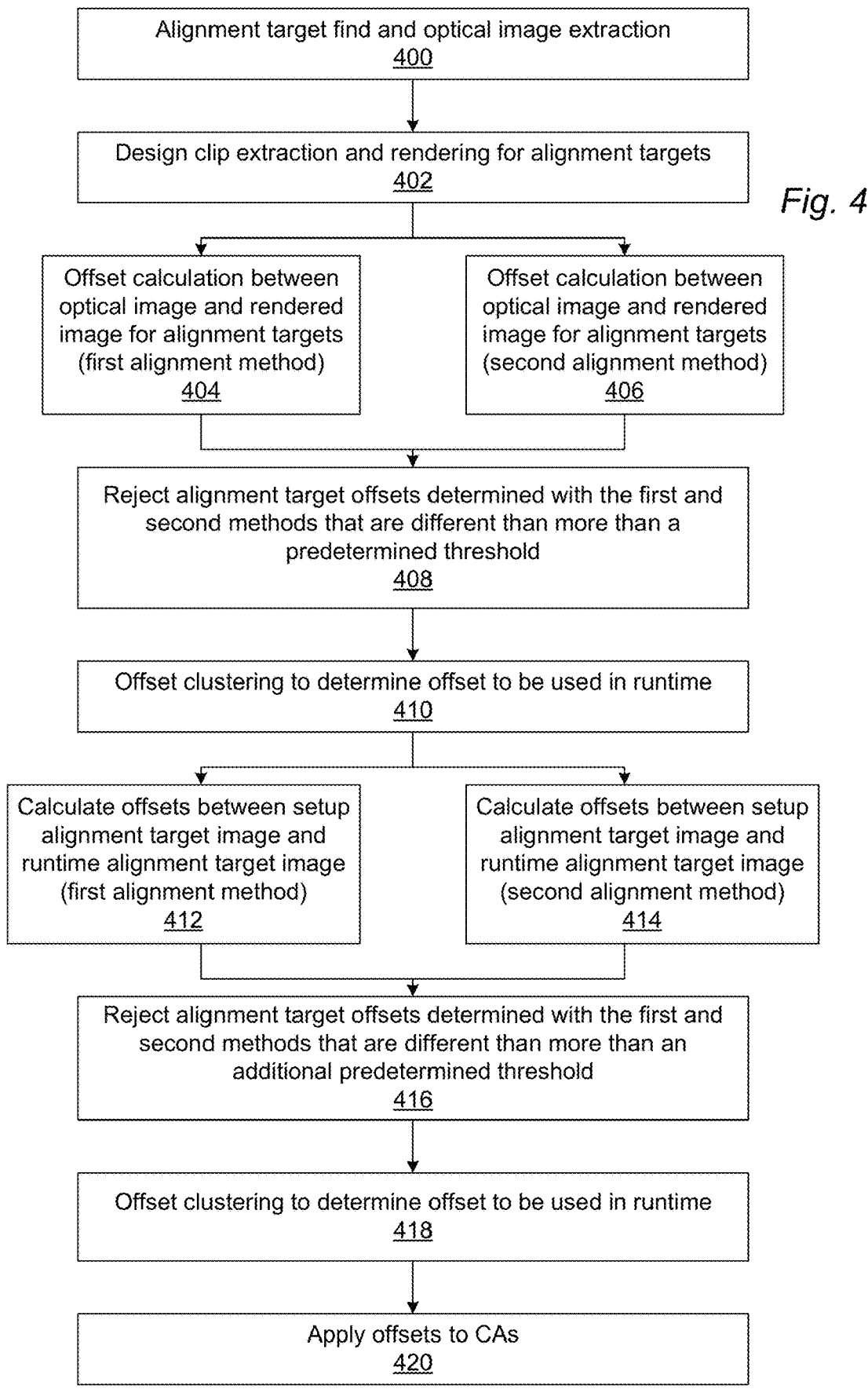
FIG. 4 is a flow chart illustrating steps that may be performed by the embodiments described herein.

FIG. 3 illustrates one example of how image-to-design alignment may be currently performed, and FIG. 4 shows one embodiment of how image-to-design alignment can be performed by the systems and methods described herein. The steps shown in these figures may be particularly suitable for PDA for DRAM. As shown in steps 300 and 400, the computer subsystem may find alignment target(s) and extract optical image(s) for the alignment target(s). For example, the computer subsystem may be configured for selecting alignment target(s) from setup images of the specimen generated with the imaging subsystem. The computer subsystem(s) may select alignment target(s) for use in setup and runtime. The alignment target(s) selected for setup and runtime may or may not be the same. For example, setup and runtime may be performed using the same alignment target, but with fewer instances of the alignment target for setup versus runtime. The opposite is also possible. The alignment target(s) selected by the computer subsystem may also include different alignment targets having different characteristics other than just different positions on the specimen or in the design. The alignment target(s) may be selected in any suitable manner known in the art.

Steps 300 and 400 may include scanning a specimen area to find unique targets. Scanning a suitable area on a specimen may be performed as described further herein. The unique targets may be unique in any manner that renders the targets suitable for alignment purposes. The unique targets may be found in any suitable manner (e.g., by searching within a predetermined image window for patterns that are unlike any others in the window). For example, the unique targets may be a pattern that has a unique shape compared to other patterns within a predetermined search window such as an image frame or job, patterns that have a unique spatial relationship with respect to each other within the predetermined search window, etc.

The alignment targets are preferably two-dimensional (2D) in that they can be used to perform alignment in both the X and Y directions, although that is not necessary. For example, the alignment targets may be selected so that one or more are useful for alignment in only the X direction and one or more others are useful for alignment in only the Y direction. The embodiments described herein may also be used with any suitable alignment targets known in the art that are selected in any suitable manner known in the art.

Although it may be practical to select multiple unique targets for use in the embodiments described herein, in general, any one or more unique targets may be selected. Each of the unique targets may be different from each other in any unique way. In addition, the unique targets may include more than one instance of the same unique target.

Examples of design-based alignment are described in U.S. Pat. No. 9,830,421 to Bhattacharyya et al. issued Nov. 28, 2017, U.S. Pat. No. 10,620,135 to Brauer issued Apr. 14, 2020, and U.S. Pat. No. 10,698,325 to Brauer issued Jun. 30, 2020, which are incorporated by reference as if fully set forth herein. The embodiments described herein may be configured to select alignment targets as described in these patents and may be further configured as described in these patents.

As shown in steps 302 and 402, the computer subsystem may be configured for design clip extraction and rendering for alignment targets. The computer subsystem may receive the design for each of the unique target(s) found in the specimen images. The computer subsystem may receive the design in any suitable manner such as by searching a design for the specimen based on information for the unique target(s) determined from the images generated by the scanning, by requesting a portion of a design (e.g., a design clip) at the position(s) of the unique target(s) from a storage medium or computer system that contains the design, etc. The design that is received by the computer subsystem may include any of the design, design data, or design information described further herein.

Rendering images for alignment targets may be performed in any suitable manner known in the art. The rendering may be performed with a deep learning (DL) or machine learning (ML) model. The rendering may also or alternatively be performed with a forward simulation model such as those that simulate the process for forming the design on the specimen and generating images of the specimen with the imaging subsystem. Examples of methods and systems that may be used for rendering alignment target images are described in U.S. Patent Application Publication No. 2022/0375051 by Brauer et al. published Nov. 24, 2022, U.S. Pat. No. 11,328,435 to Brauer et al. issued May 10, 2022 and U.S. Pat. No. 11,580,650 to Brauer et al. issued Feb. 14, 2023, and U.S. patent application Ser. No. 18/178, 528 by Chen et al. filed Mar. 5, 2023, which are incorporated by reference as if fully set forth herein. The embodiments described herein may be further configured as described in these references.

The system includes a computer subsystem configured for determining first and second align-to-design offsets for multiple instances of an alignment target by separately aligning images of the multiple instances of the alignment target formed on the specimen and generated by the imaging subsystem to a rendered image for the alignment target with first and second alignment methods, respectively. In this manner, for each instance of an alignment target on the specimen, two alignments may be performed with two different alignment methods to determine two different offsets. Each of the alignment methods may be separately performed for each alignment target instance. The offset determined by each of the alignment methods may be the same offset, i.e., an offset between a setup image of the alignment target on the specimen and a rendered image of the alignment target, but possibly with different values due to the different alignment methods. In addition, depending on the alignment target, the first and second align-to-design offsets may be only offsets in the X direction, only offsets in the Y direction, or offsets in both the X and Y direction. In this manner, the first align-to-design offsets for any one alignment target instance may include one or more align-to-design offsets determined with the first alignment method, and the second align-to-design offsets for any one alignment target instance may include one or more align-to-design offsets determined with the second alignment method.

As shown in step 404 of FIG. 4, the computer subsystem is configured for offset calculation between optical (or other) image and rendered image for alignment targets (with a first alignment method). In addition, as shown in step 406 of FIG. 4, the computer subsystem is configured for offset calculation between optical (or other) image and rendered image for alignment targets (with a second alignment method). These steps are in contrast to how the alignment is normally performed in setup in currently used methods. For example, as shown in step 304 in FIG. 3, currently used methods usually perform offset calculation between optical (or other) image and rendered image for alignment targets with a single alignment method. In contrast, in the embodiments described herein, the computer subsystem is configured for determining different offsets between the specimen images of the alignment target instances and a rendered alignment target image based on results of aligning the images to each other with different alignment methods, respectively. These offsets may be determined in any suitable manner and may be expressed in any suitable manner (e.g., as a Cartesian offset, as a two-dimensional function, etc.).

In one embodiment, one of the first and second alignment methods includes normalized cross correlation (NCC). NCC may be performed using any suitable method, algorithm, function, etc. known in the art. In another embodiment, one of the first and second alignment methods includes projection-based NCC. In this manner, the embodiments described herein may use projection NCC to calculate PDA offset. In general, projection NCC includes aligning 1D projection profiles of optical image and rendered image during PDA setup. While other alignment methods may be used for the first and second alignment methods in setup, for the PDA targets described herein, using NCC and projection NCC for the first and second alignment methods may be the most robust approaches.

The computer subsystem is also configured for identifying the multiple instances having a difference between the first and second align-to-design offsets below a predetermined threshold. In this manner, the identifying step may include calculating a difference between the first and second align-to-design offsets for each instance of the alignment target and then comparing the difference to the predetermined threshold. Any of the multiple instances identified as having a difference below the predetermined threshold may be retained for additional steps described herein, and any of the non-identified multiple instances may be rejected. For example, as shown in step 408 of FIG. 4, the computer subsystem may be configured for rejecting alignment target offsets determined with the first and second alignment methods that are different than more than a predetermined threshold. As can be seen by comparison with FIG. 3, currently used methods do not include any such step since they only use one alignment method for calculating align-to-design offsets during setup.

For 2D alignment targets, this step may be separately performed for each offset. For example, a difference between the align-to-design X offsets determined for each instance of the alignment target with the two alignment methods may be compared to a predetermined threshold, and any align-to-design X offsets having a difference below the predetermined threshold may be retained for additional processing while other align-to-design X offsets are rejected. These same steps may be performed for the align-to-design Y offsets determined for the alignment target instances with the first and second alignment methods. For any one alignment target instance, therefore, (1) both the X and Y align-to-design offsets may be retained, (2) one of the X and Y align-to-design offsets may be retained and the other may be rejected, or (3) both the X and Y align-to-design offsets may be rejected. In this manner, although any one instance of an alignment target will most likely have both X and Y align-to-design offsets retained or rejected, if there is an instance when a 2D alignment target instance yields only one good align-to-design offset, that offset can be retained for further processing.

In one embodiment, the predetermined threshold is defined in pixels. The predetermined threshold that is used in the embodiments described herein may have different values depending on, for example, the repeating pitch of the patterned features formed on the specimen. The predetermined threshold may be selected by a user or determined by the computer subsystem, e.g., based on information about the design formed on the specimen. With one of the PDA offsets calculated based on, for example, projection-based NCC, any offsets beyond more than ±1 pixel from an NCC based PDA offset calculation can be rejected, and the remaining offsets can be used for PDA clustering. This can be used in both PDA setup and runtime to get rid of false positive PDA offset.

The computer subsystem is configured for determining a runtime align-to-design offset for the alignment target from the first and second align-to-design offsets determined for only the identified multiple instances. In one embodiment, determining the runtime align-to-design offset includes clustering the first and second align-to-design offsets. For example, as shown in step 410 of FIG. 4, the computer subsystem may be configured for performing offset clustering to determine an align-to-design offset to be used in runtime. The PDA offsets from all of the targets in a subswath can vary by several pixels. Some of the offsets may be inaccurate either due to repeating patterns or misalignment. Clustering helps to identify the true offsets. The offset clustering may be performed using a Fuzzy K-Mean with a multi-cluster arbitration algorithm or any other suitable method or algorithm known in the art. In the case of one-dimensional (1D) alignment targets, this step would be performed only once for the X or Y offset. In the case of 2D alignment targets, this step may be performed separately for the X and Y offsets.

The currently used methods may also include offset clustering to determine the offset to be used in runtime between optical (or other) images and rendered images, e.g., a runtime align-to-design offset (as shown in step 306 of FIG. 3). The purpose of any offset clustering is to reject the outliers and find the mean value of the group with similar samples. However, in currently used methods, the offset clustering is performed for an alignment target with all of the offsets determined for all instances of the alignment target without regard to what the offset values are. For some alignment targets such as those described further herein, one alignment method may generate multiple, substantially different offsets for each target, which can cause confusion for offset clustering. In other words, out of multiple offsets generated for each alignment target, there could be more than one incorrect offset or even only one offset that is correct. So configuring the embodiments described herein to reject the incorrect offsets upfront, prior to clustering, will reduce the error in the clustering result, and may even make the clustering error proof. In this manner, the embodiments described herein alter the input to the runtime align-to-design offset clustering step in an important and meaningful manner. The computer subsystem is configured for storing the runtime align-to-design offset for use in a process performed on the specimen with the imaging subsystem. The computer subsystem may store the runtime align-to-design offset in any suitable computer-readable storage medium. The runtime align-to-design offset may be stored with any of the results described herein and may be stored in any manner known in the art. The storage medium may include any storage medium described herein or any other suitable storage medium known in the art. After the runtime align-to-design offset has been stored, the runtime align-to-design offset can be accessed in the storage medium and used by any of the method or system embodiments described herein, formatted for display to a user, used by another software module, method, or system, etc.

Storing the runtime align-to-design offset may include storing the runtime align-to-design offset for use in the process performed on the specimen and the process performed on at least one other specimen of the same type as the specimen. For example, the embodiments described herein may set up alignment of a specimen for a process recipe, which may be performed as part of setting up, creating, calibrating, or updating the recipe. That recipe may then be stored and used by the embodiments described herein (and/or another system or method) to perform the process on the specimen and/or other specimens to thereby generate information (e.g., defect information) for the specimen and/or other specimens. In this manner, the runtime align-to-design offset may be generated and stored once per specimen layer, and the runtime align-to-design offset may be used for the process performed on multiple specimens of the same layer. Of course, as in any process, if the process performed on the specimen layer is updated, calibrated, modified, re-trained, etc., the runtime align-to-design offset may also be updated, calibrated, modified, retrained, etc. in the same manner as any other process parameter. Updating, calibrating, modifying, retraining, etc. the runtime align-to-design offset may be performed in the same manner described herein for determining an offset for use in a process performed on a specimen. In this manner, the embodiments described herein may be configured for repeating the steps described herein at various times to modify a previously setup process.

As described herein, therefore, the embodiments can be used to setup a new process or recipe. The embodiments may also be used to modify an existing process or recipe, whether that is a process or recipe that was used for the specimen or was created for one specimen and is being adapted for another specimen. In addition, the embodiments described herein are not limited to inspection process creation or modification. For example, the embodiments described herein can also be used to setup or modify a process for metrology, defect review, etc. in a similar manner. In particular, determining an offset for use in a process and performing specimen-to-design alignment as described herein can be performed regardless of the process that is being setup or revised. The embodiments described herein can therefore be used not just for setting up or modifying an inspection process but can be used for setting up or modifying any quality control type process performed on the specimens described herein.

In one embodiment, the computer subsystem is configured for storing one or more of the images of the multiple instances of the alignment target for use as the setup alignment target image. For example, as described further herein, in runtime, the computer subsystem may align a runtime alignment target image to a setup alignment target image. The setup alignment target image may be any of the alignment target images generated as described herein. A setup alignment target image may be stored as described further herein so that it can be retrieved and used during the process. One or more setup alignment target images may be stored for each alignment target, when more than one alignment target is used for a specimen. However, the same setup alignment target image may be used for more than one instance of the same alignment target.

In one embodiment, the process includes generating runtime alignment target images for the multiple instances of the alignment target with the imaging subsystem. Generating the runtime alignment target images for the alignment target may be performed as described further herein.

During the process, the computer subsystem is configured for determining first and second runtime-to-setup offsets for the multiple instances of the alignment target by separately aligning the runtime alignment target images to a setup alignment target image with the first and second alignment methods, respectively. In this manner, for each instance of an alignment target on the specimen, two alignments may be performed with two different alignment methods to determine two different offsets. Each of the alignment methods may be separately performed for each alignment target instance.

The offset determined by each of the alignment methods may be the same offset, i.e., an offset between a runtime image of the alignment target on the specimen and a setup image of the alignment target on the specimen, but possibly with different values due to the different alignment methods. In addition, depending on the alignment target, the first and second runtime-to-setup offsets may be only offsets in the X direction, only offsets in the Y direction, or offsets in both the X and Y directions. In this manner, the first runtime-to-setup offsets for any one alignment target instance may include one or more runtime-to-setup offsets determined with the first alignment method, and the second runtime-to-setup offsets for any one alignment target instance may include one or more runtime-to-setup offsets determined with the second alignment method.

As shown in step 412 of FIG. 4, the computer subsystem is configured for calculating offsets between setup alignment target image and runtime alignment target image with a first alignment method. In addition, as shown in step 414, the computer subsystem is configured for calculating offsets between setup alignment target image and runtime alignment target image using a second alignment method. Both of these steps may be separately performed for each instance of the alignment target being used in the process. These steps are in contrast to how the alignment is normally performed in runtime in currently used methods. For example, as shown in step 308 of FIG. 3, currently used methods usually perform offset calculation between setup alignment target image and runtime alignment target image with a single alignment method. In contrast, in the embodiments described herein, the computer subsystem is configured for determining different offsets between the setup image of the alignment target instances and runtime alignment target images based on results of aligning the images to each other with different alignment methods, respectively. These offsets may be determined in any suitable manner and may be expressed in any suitable manner (e.g., as a Cartesian offset, as a two-dimensional function, etc.).

The first and second alignment methods used in runtime will more than likely be the same first and second alignment methods used in setup. In general, NCC and projection NCC may be performed in runtime as described herein, just with different image sets, i.e., setup alignment target images and runtime alignment target images instead of design. For example, runtime projection NCC includes aligning 1D projection profiles of setup images and runtime PDA target images during runtime. While other alignment methods may be used for the first and second alignment methods in runtime, for the PDA targets described herein, NCC and projection NCC may be the most robust approaches.

The computer subsystem is also configured for identifying a subset of the multiple instances having a difference between the first and second runtime-to-setup offsets below an additional predetermined threshold. In this manner, the identifying step may include calculating a difference for the first and second runtime-to-setup offsets for each instance of the alignment target and then comparing the difference to the additional predetermined threshold. Any of the multiple instances identified as having a difference below the additional predetermined threshold may be retained for additional steps described herein, and any of the non-identified multiple instances may be rejected. For example, as shown in step 416 of FIG. 4, the computer subsystem is configured for rejecting alignment target offsets determined with the first and second methods that are different than more than an additional predetermined threshold. As can be seen by comparison with FIG. 3, currently used methods do not include any such step since they only use one alignment method for calculating runtime-to-setup offsets during runtime. Step 416 may be performed for 2D alignment targets as described further herein.

In one embodiment, the additional predetermined threshold is defined in pixels. The additional predetermined threshold may be greater than ±1 pixels. The additional predetermined threshold that is used in the embodiments described herein may have different values and may be selected as described further herein. The predetermined threshold used in setup and the additional predetermined threshold may also have the same value or may have different values. With one of the PDA offsets calculated based on, for example, projection-based NCC, any offsets beyond more than ±1 pixel from NCC based PDA offset calculation can be rejected, and the remaining offsets can be used for PDA clustering. This approach can be used in PDA runtime to get rid of false positive PDA offset.

The computer subsystem is further configured for determining a final runtime-to-setup offset for the alignment target from the first and second runtime-to-setup offsets determined for only the identified subset of the multiple instances. In one embodiment, determining the final runtime-to-setup offset includes clustering the first and second runtime-to-setup offsets. For example, as shown in step 418, the computer subsystem may be configured for offset clustering to determine offset to be used in runtime. As in setup, during runtime, the PDA offsets from all of the targets in a subswath can vary by several pixels for the same reasons described further herein. Clustering helps to identify the true offsets. The offset clustering may be performed during runtime as described further herein.

The currently used method may also include offset clustering to determine offset to be used in runtime, e.g., a runtime-to-setup offset, (as shown in step 310 of FIG. 3). However, in such methods, the offset clustering is performed for an alignment target with all of the offsets determined for all instances of the alignment target without regard to what the offsets are. In the same manner described further herein, configuring the embodiments described herein to reject the incorrect offsets upfront, prior to clustering, will reduce the error in the clustering result, and may even make the clustering error proof. In this manner, the embodiments described herein alter the input to the final runtime-to-setup offset clustering step in an important and meaningful manner. The computer subsystem is further configured for determining a runtime-to-design offset based on the final runtime-to-setup offset and the runtime align-to-design offset. Determining a runtime-to-design offset based on the final runtime-to-setup offset and the runtime align-to-design offset may include modifying the runtime align-to-design offset by or with the final runtime-to-setup offset in any suitable manner. This step may be performed to correct the runtime align-to-design offset for any differences in the alignment of the setup and runtime specimens to the imaging subsystem and any other differences between the setup and runtime specimens such as placement differences in the alignment targets on different specimens.

In one embodiment, during the process the computer subsystem is configured for identifying care areas (CAs) in images of the specimen generated by the imaging subsystem during the process based on the runtime-to-design offset. For example, as shown in step 420 of FIG. 4, the computer subsystem may apply offset to CAs or place care areas according to offset correction. "Care areas" as they are commonly referred to in the art are areas on a specimen that are of interest for inspection purposes. Sometimes, care areas are used to differentiate between areas on the specimen that are inspected from areas on the specimen that are not inspected in an inspection process. In addition, care areas are sometimes used to differentiate between areas on the specimen that are to be inspected with one or more different parameters. For example, if a first area of a specimen is more critical than a second area on the specimen, the first area may be inspected with a higher sensitivity than the second area so that defects are detected in the first area with a higher sensitivity. Other parameters of an inspection process can be altered from care area to care area in a similar manner.

In these embodiments, the computer subsystem may use 0 CA border in X and Y directions. For example, because the embodiments described herein can align specimen images to design with substantially high accuracy, the CAs can be identified in the specimen images with substantially high accuracy. For example, even if the offsets are applied to CAs in step 420 in the same manner as they are in the currently performed methods, e.g., in step 312 of FIG. 3, the CAs may be placed more accurately by the embodiments described herein because the offsets are more accurate. Therefore, a border, which is commonly used to increase a CA artificially to account for any errors in CA placement, can be effectively eliminated by the embodiments described herein. Placing the CAs with such high accuracy and eliminating the CA border is advantageous for a number of reasons including that the detection of nuisance on the specimen can be significantly reduced and the detection of defects of interest (DOIs) on the specimen can be improved.

In some embodiments, the multiple instances of the alignment target are formed in a DRAM device portion of the specimen. For example, the embodiments described herein provide robust PDA for advanced DRAM devices. For advanced design rule DRAM devices, several PDA offsets may be generated for each PDA target from sense amplifier (SA)/sub-wordline (SWD)/conjunction patterns because of repeating features inside the bulk cell region, which can cause PDA clustering to fail during PDA setup and runtime. The embodiments described herein address the deficiency of current PDA for advanced design rule DRAM devices for which a substantial amount of PDA setup and runtime failures have been seen.

More specifically, advanced design rule DRAM devices tend to have lower contrast in images generated by imaging subsystems described herein in the SA/SWD/Conjunction and repeating patterns with smaller pitch in the SA/SWD. An NCC based approach that calculates the offset between optical image and design-rendered image of PDA targets from SA/SWD/Conjunction can generate multiple offsets for each PDA target, which can cause confusion for PDA clustering. For example, for a non-repeating target, only one set of offsets in X and Y may be calculated. For a target with repeating patterns in either X or Y, multiple offsets may be calculated. Out of the multiple offsets generated for each PDA target, there could be only one offset that is correct. Therefore, rejecting the incorrect offsets upfront can make the clustering error proof.

Figure 5:
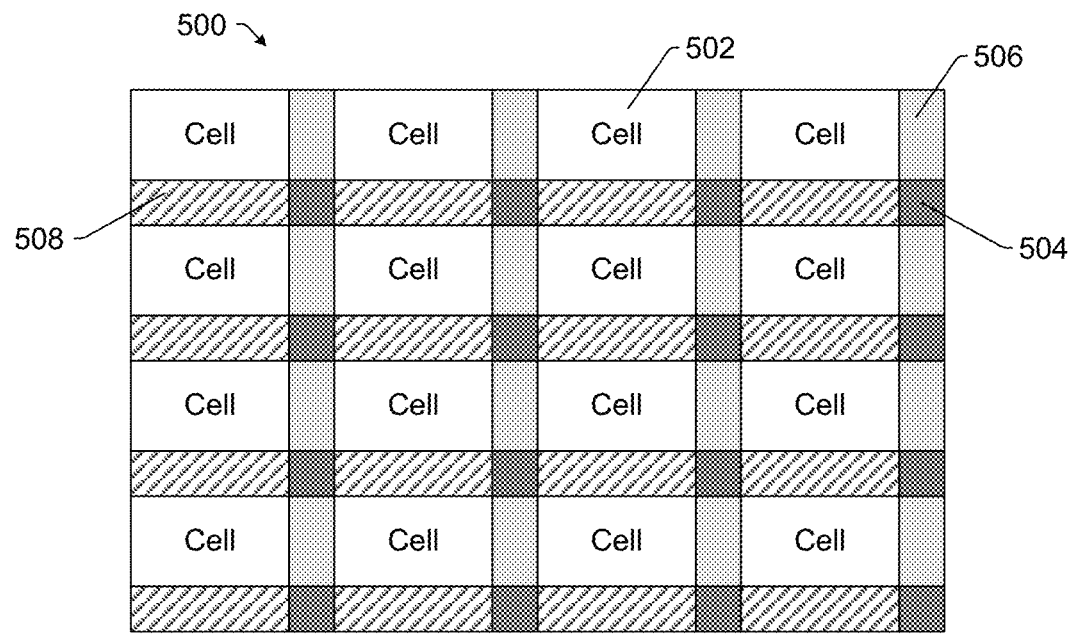
FIG. 5 is a schematic diagram illustrating a plan view of one example of different blocks that may be included in a dynamic random access memory (DRAM) device portion of a specimen.

FIG. 5 illustrates one general layout of a DRAM area that may be formed on a specimen. FIG. 5 is included here just to illustrate the general spatial relationships between the different DRAM regions. As shown in this figure, DRAM area 500 includes multiple bulk cell regions 502. SA regions 506 are located between each of the bulk cell regions in a row of the DRAM region. SWD regions 508 are formed between each of the bulk cell regions in a column of the DRAM region. Conjunction regions 504 are formed between adjacent SA regions and adjacent SWD regions. The DRAM layout is unique compared to other types of devices such as logic devices with static random-access memory (SRAM) and vertical NAND (VNAND). The embodiments described herein take advantage of the unique DRAM layout to identify PDA targets, calculate their offsets, and use them in runtime in ways different than currently used PDA.

Figure 6:
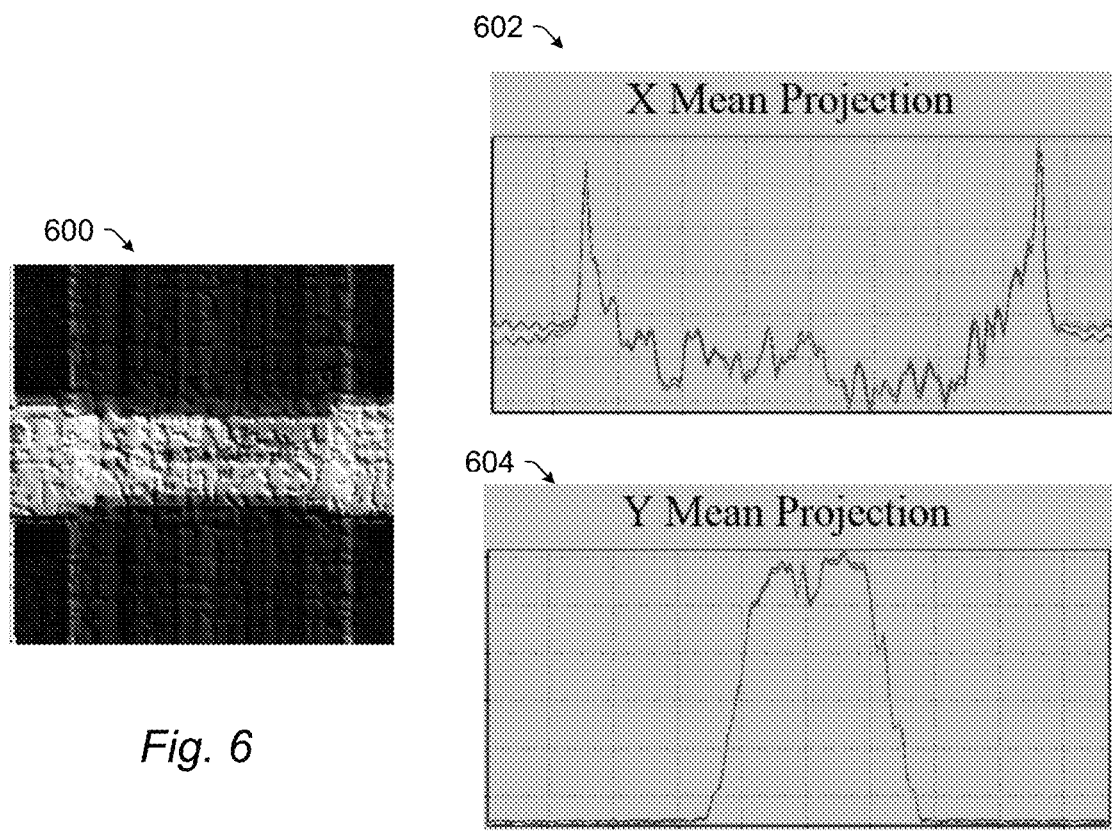
FIGS. 6-8 include examples of images of different portions of a DRAM device containing structures that may be used as alignment targets in the embodiments described herein and examples of plots of X and Y mean projections for the structures.

In one embodiment, the multiple instances of the alignment target are formed in a conjunction block of a memory device area formed on the specimen. For example, PDA targets selected from conjunction of advanced DRAM have relatively good separation between the bulk cell region and the SA/SWD/Conjunction regions. The projection of PDA target images and their rendered image along X and Y may give multiple offsets without ambiguity, as shown in FIG. 6. Image 600 is a DRAM image at a SA/SWD/Conjunction area, X Mean Projection 602 is the X projection generated for this image, and Y Mean Projection 604 is the Y projection generated for this image. As can be seen from these projections, the image in the SA/SWD/Conjunction area can be used for both X and Y offsets.

Figure 7:
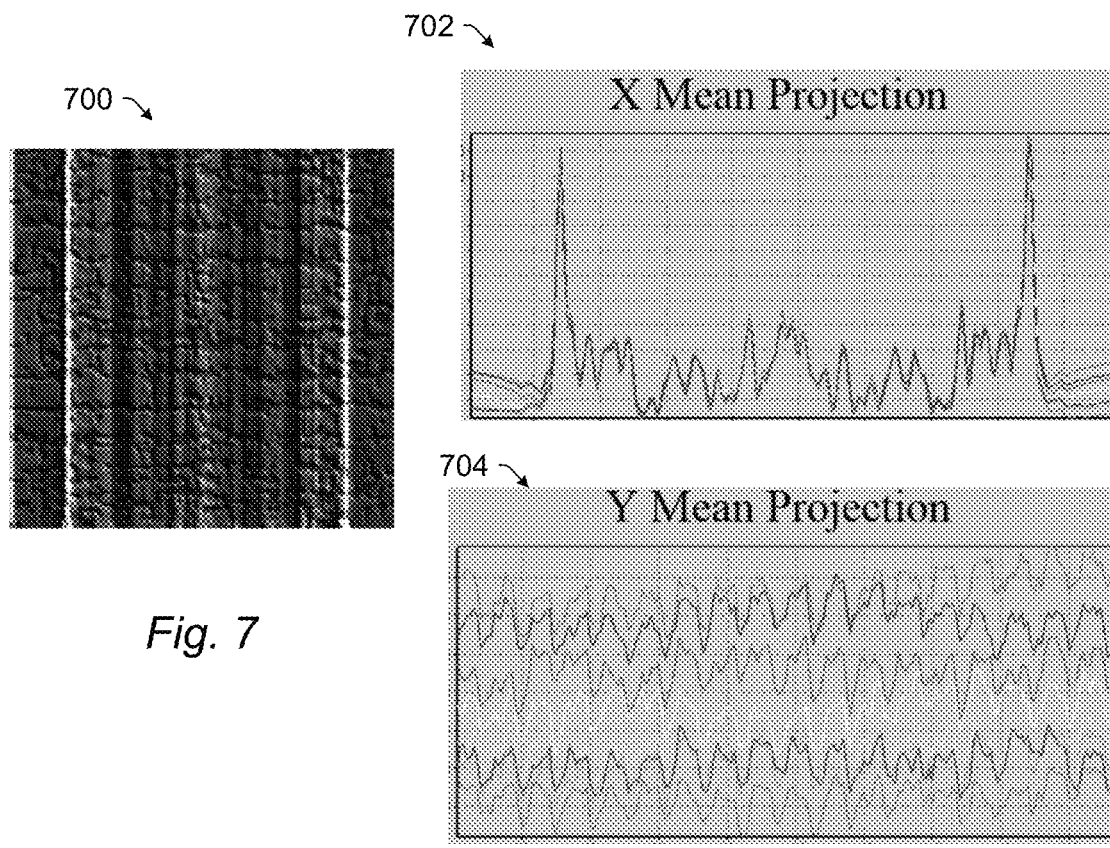
Figure 8:
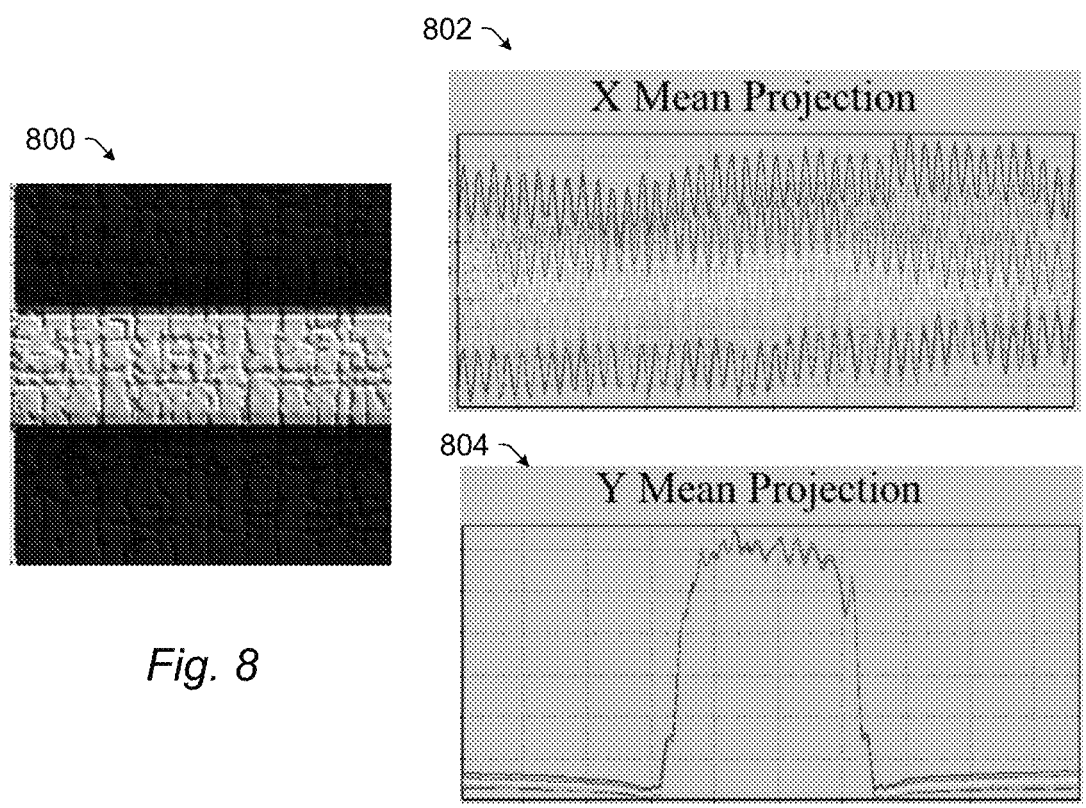

In an additional embodiment, the multiple instances of the alignment target are formed in a boundary region between an SA block and a bulk cell block of a memory device area formed on the specimen. In a further embodiment, the multiple instances of the alignment target are formed in a boundary region between an SWD block and a bulk cell block of a memory device area formed on the specimen. For example, for PDA targets from SA/bulk cell boundary or SWD/bulk cell boundary, the projection of PDA targets and their rendered image along X and Y may give only one offset along X or Y with the other direction repeating. In this case, for PDA targets with Y repeating, only X offset is used and vice versa. In one such example, image 700 shown in FIG. 7 is one example of a DRAM PDA target, X Mean Projection 702 is the X projection generated for this image, and Y Mean projection 704 is the Y projection for this image. As can be seen from these projections, this PDA target has a valid X offset but Y repeating. In another example, image 800 shown in FIG. 8 is one example of a DRAM PDA target, X Mean Projection 802 is the X projection generated for this image, and Y Mean projection 804 is the Y projection generated for this image. As can be seen from these projections, this PDA target has a valid Y offset, but X repeating.

Each of the images shown in FIGS. 6-8 is not meant to illustrate any particular specimen(s) or characteristics thereof for which the embodiments described herein may be used. Instead, the images shown in the figures are merely intended to promote understanding of the embodiments described herein. The images actually used in the embodiments will vary depending on the specimen and its characteristics, which are related to its design, and the configuration of the imaging subsystem that generates the actual images for the specimen(s).

The embodiments described herein may also perform the process after the specimen has been aligned in runtime as described above. In one embodiment, the process is an inspection process. However, the process may include any of those described herein such as inspection, defect review, metrology, and the like. The process may also include any suitable processing of the images after they have been aligned to design. For example, in the case of inspection, the computer subsystem may determine differences between the specimen images and a reference image, which may be aligned to the specimen images using one of the offsets described herein. The computer subsystem may also compare the differences to a threshold and determine that any image differences above the threshold correspond to a defect or potential defect. Of course, this may be the simplest method for defect detection, and the computer subsystem may be configured for detecting defects in the images with any suitable method or algorithm known in the art. Prior to performing the defect detection, the CAs may be placed in the runtime specimen images as described further herein. The computer subsystem may also be configured for performing additional steps for the detected defects such as filtering or classifying the defects based on their position in the design, which may be determined using the offsets described herein. The embodiments described herein may also be configured for performing any other steps normally performed during an inspection process.

The computer subsystem may be configured for storing information for the specimen generated by performing the process such as information for detected defects in any suitable computer-readable storage medium. The information may be stored with any of the results described herein and may be stored in any manner known in the art. The storage medium may include any storage medium described herein or any other suitable storage medium known in the art. After the information has been stored, the information can be accessed in the storage medium and used by any of the method or system embodiments described herein, formatted for display to a user, used by another software module, method, or system, etc.

Results and information generated by performing the processes described herein on the specimen or other specimens of the same type may be used in a variety of manners by the embodiments described herein and/or other systems and methods. Such functions include, but are not limited to, altering a process such as a fabrication process or step that was or will be performed on the specimen or another specimen in a feedback or feedforward manner. For example, the computer subsystem may be configured to determine one or more changes to a process that was or will be performed on a specimen inspected as described herein based on the detected defect(s). The changes to the process may include any suitable changes to one or more parameters of the process. The computer subsystem preferably determines those changes such that the defects can be reduced or prevented on other specimens on which the revised process is performed, the defects can be corrected or eliminated on the specimen in another process performed on the specimen, the defects can be compensated for in another process performed on the specimen, etc. The computer subsystem may determine such changes in any suitable manner known in the art.

Those changes can then be sent to a semiconductor fabrication system (not shown) or a storage medium (not shown) accessible to the computer subsystem and the semiconductor fabrication system. The semiconductor fabrication system may or may not be part of the system embodiments described herein. For example, the computer subsystem and/or imaging subsystem described herein may be coupled to the semiconductor fabrication system, e.g., via one or more common elements such as a housing, a power supply, a specimen handling device or mechanism, etc. The semiconductor fabrication system may include any semiconductor fabrication system known in the art such as a lithography tool, an etch tool, a chemical-mechanical polishing (CMP) tool, a deposition tool, and the like.

The embodiments described herein have a number of important advantages over the currently available methods and systems for PDA for DRAM devices. For example, the embodiments described herein provide solutions for PDA for advanced design rule DRAM devices where the currently used PDA methods are struggling. Without the proposed embodiments, currently used systems and methods may not be able to inspect the most advanced design rule DRAM devices with the current substantially high accuracy requirement of CA placement.

The advantages of the proposed embodiments are provided by a number of important new features. One such new feature is that they use projection NCC to align PDA target images with rendered image at PDA setup time to get rid of false positive NCC based offsets. Another such new feature is the use of projection NCC to align PDA target images from setup with runtime PDA target images to get rid of false positive NCC based offsets.

Each of the embodiments of each of the systems described above may be combined together into one single embodiment.

Another embodiment relates to a computer-implemented method for determining an offset for use in a process performed on a specimen. The method includes determining first and second align-to-design offsets for multiple instances of an alignment target formed on a specimen by separately aligning images of the multiple instances of the alignment target generated by an imaging subsystem to a rendered image for the alignment target with first and second alignment methods, respectively, e.g., as shown in steps 404 and 406 in FIG. 4. The methods also includes identifying the multiple instances having a difference between the first and second align-to-design offsets below a predetermined threshold, e.g., as shown in step 408 of FIG. 4. In addition, the method includes determining a runtime align-to-design offset for the alignment target from the first and second align-to-design offsets determined for only the identified multiple instances, e.g., as shown in step 410 of FIG. 4. The method further includes storing the runtime align-to-design offset for use in a process performed on the specimen with the imaging subsystem. These steps are performed by a computer system.

Each of the steps of the method may be performed as described further herein. The method may also include any other step(s) that can be performed by the system, computer system, and/or imaging subsystem described herein. The computer system may be configured according to any of the embodiments described herein, e.g., computer subsystem 36. The imaging subsystem may be configured according to any of the embodiments described herein, e.g., imaging subsystem 10. In addition, the method described above may be performed by any of the system embodiments described herein.

Figure 9:
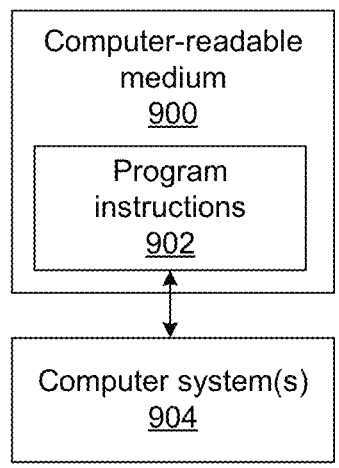
FIG. 9 is a block diagram illustrating one embodiment of a non-transitory computer-readable medium storing program instructions for causing a computer system to perform a computer-implemented method described herein.

An additional embodiment relates to a non-transitory computer-readable medium storing program instructions executable on a computer system for performing a computer-implemented method for determining an offset for use in a process performed on a specimen. One such embodiment is shown in FIG. 9. In particular, as shown in FIG. 9, non-transitory computer-readable medium 900 includes program instructions 902 executable on computer system(s) 904. The computer-implemented method may include any step(s) of any method(s) described herein.

Program instructions 902 implementing methods such as those described herein may be stored on computer-readable medium 900. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system(s) 904 may be configured according to any of the embodiments described herein.

Further modifications and alternative embodiments of various aspects of the invention will be apparent to those skilled in the art in view of this description. For example, methods and systems for determining an offset for use in a process performed on a specimen are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:

1. A system configured for determining an offset for use in a process performed on a specimen, comprising:
   an imaging subsystem configured for generating images of a specimen; and
   a computer subsystem configured for:
      determining first and second align-to-design offsets for multiple instances of an alignment target by separately aligning images of the multiple instances of the alignment target formed on the specimen and generated by the imaging subsystem to a rendered image for the alignment target with first and second alignment methods, respectively;
      identifying the multiple instances having a difference between the first and second align-to-design offsets below a predetermined threshold;
      determining a runtime align-to-design offset for the alignment target from the first and second align-to-design offsets determined for only the identified multiple instances; and
      storing the runtime align-to-design offset for use in a process performed on the specimen with the imaging subsystem.

2. The system of claim 1, wherein determining the runtime align-to-design offset comprises clustering the first and second align-to-design offsets.

3. The system of claim 1, wherein one of the first and second alignment methods comprises normalized cross correlation.

4. The system of claim 1, wherein one of the first and second alignment methods comprises projection-based normalized cross correlation.

5. The system of claim 1, wherein the predetermined threshold is defined in pixels.

6. The system of claim 1, wherein the process comprises generating runtime alignment target images for the multiple instances of the alignment target with the imaging subsystem, and wherein during the process the computer subsystem is further configured for determining first and second runtime-to-setup offsets for the multiple instances of the alignment target by separately aligning the runtime alignment target images to a setup alignment target image with the first and second alignment methods, respectively, identifying a subset of the multiple instances having a difference between the first and second runtime-to-setup offsets below an additional predetermined threshold, determining a final runtime-to-setup offset for the alignment target from the first and second runtime-to-setup offsets determined for only the identified subset of the multiple instances, and determining a runtime-to-design offset based on the final runtime-to-setup offset and the runtime align-to-design offset.

7. The system of claim 6, wherein determining the final runtime-to-setup offset comprises clustering the first and second runtime-to-setup offsets.

8. The system of claim 6, wherein the additional predetermined threshold is defined in pixels.

9. The system of claim 6, wherein during the process the computer subsystem is further configured for identifying care areas in images of the specimen generated by the imaging subsystem during the process based on the runtime-to-design offset.

10. The system of claim 6, wherein the computer subsystem is further configured for storing one or more of the images of the multiple instances of the alignment target for use as the setup alignment target image.

11. The system of claim 1, wherein the multiple instances of the alignment target are formed in a dynamic random access memory device portion of the specimen.

12. The system of claim 1, wherein the multiple instances of the alignment target are formed in a conjunction block of a memory device area formed on the specimen.

13. The system of claim 1, wherein the multiple instances of the alignment target are formed in a boundary region between a sense amplifier block and a bulk cell block of a memory device area formed on the specimen.

14. The system of claim 1, wherein the multiple instances of the alignment target are formed in a boundary region between a sub-wordline driver block and a bulk cell block of a memory device area formed on the specimen.

15. The system of claim 1, wherein the computer subsystem is further configured for generating the rendered image for the alignment target from a design for the specimen.

16. The system of claim 1, wherein the process is an inspection process.

17. The system of claim 1, wherein the imaging subsystem is a light-based imaging subsystem.

18. The system of claim 1, wherein the imaging subsystem is an electron beam imaging subsystem.

19. A non-transitory computer-readable medium, storing program instructions executable on a computer system for performing a computer-implemented method for determining an offset for use in a process performed on a specimen, wherein the computer-implemented method comprises:

determining first and second align-to-design offsets for multiple instances of an alignment target formed on a specimen by separately aligning images of the multiple instances of the alignment target generated by an imaging subsystem to a rendered image for the alignment target with first and second alignment methods, respectively;

identifying the multiple instances having a difference between the first and second align-to-design offsets below a predetermined threshold;

determining a runtime align-to-design offset for the alignment target from the first and second align-to-design offsets determined for only the identified multiple instances; and storing the runtime align-to-design offset for use in a process performed on the specimen with the imaging subsystem.

20. A computer-implemented method for determining an offset for use in a process performed on a specimen, comprising:

determining first and second align-to-design offsets for multiple instances of an alignment target formed on a specimen by separately aligning images of the multiple instances of the alignment target generated by an imaging subsystem to a rendered image for the alignment target with first and second alignment methods, respectively;

identifying the multiple instances having a difference between the first and second align-to-design offsets below a predetermined threshold;

determining a runtime align-to-design offset for the alignment target from the first and second align-to-design offsets determined for only the identified multiple instances; and storing the runtime align-to-design offset for use in a process performed on the specimen with the imaging subsystem, wherein determining the first and second align-to-design offsets, identifying the multiple instances, determining the runtime align-to-design offset, and storing the runtime align-to-design offset are performed by a computer system.

* * * * *